(12) United States Patent
Lee

(10) Patent No.: US 6,571,725 B1
(45) Date of Patent: Jun. 3, 2003

(54) WATERCRAFT WITH ANTICAVITATION CONTROL

(76) Inventor: Michael Ronald Lee, 40805 Whittier Ave., Hemet, CA (US) 92544

( * ) Notice: Subject to any disclaimer, the term of this patent is extended or adjusted under 35 U.S.C. 154(b) by 0 days.

(21) Appl. No.: 10/215,494

(22) Filed: Aug. 8, 2002

(51) Int. Cl.[7] .................................................. B63B 1/32
(52) U.S. Cl. ...................................................... 114/288
(58) Field of Search ................................. 114/288, 125, 114/289, 290, 121

(56) References Cited

U.S. PATENT DOCUMENTS

| | | | |
|---|---|---|---|
| 3,131,664 A | 5/1964 | McInvale | |
| D210,755 S | 4/1968 | Lang | |
| 4,341,177 A | * 7/1982 | Miyazaki et al. | 114/125 |
| 4,823,722 A | 4/1989 | Gass | |
| 4,889,066 A | 12/1989 | Neil et al. | |
| D318,843 S | 8/1991 | Rowe | |
| 5,237,947 A | * 8/1993 | Manning | 114/125 |
| 5,237,952 A | 8/1993 | Rowe | |
| 5,524,568 A | * 6/1996 | Bobst | 114/289 |
| 5,704,309 A | 1/1998 | Kohnen | |
| D408,779 S | 4/1999 | Ishigaki | |
| D415,464 S | 10/1999 | Frechette | |

FOREIGN PATENT DOCUMENTS

EP 0321372 B1 7/1990

* cited by examiner

Primary Examiner—S. Joseph Morano
Assistant Examiner—Lars A. Olson
(74) Attorney, Agent, or Firm—Gene Scott-Patent Law & Venture Group

(57) ABSTRACT

A water craft apparatus has an elongated hull with turbine propulsion drive adapted for ingesting water at a turbine water intake and for ejecting the water, with high velocity, at a turbine water outlet. A plurality of water suction apertures are arranged along both a starboard and a port portions of the hull, and these are in communication, through an intake manifold, with the turbine at the water intake for delivering the water from the body of water to the turbine. A plurality of aperture doors are hingably mounted on the hull, each one of the plurality of aperture doors is movable between an open attitude spaced outwardly from the one of the water suction apertures enabling admittance of the water into the intake manifold, and a closed attitude positioned for sealing the one of the water suction apertures. The apertures span a longitudinal distance along the hull. The longitudinal distance exceeds a horizontal length of a wave cycle of the body of water. The aperture doors are closed automatically when the surface level of the body of water moves below any of the aperture.

5 Claims, 2 Drawing Sheets

WATERCRAFT WITH ANTICAVITATION CONTROL

BACKGROUND OF THE INVENTION

INCORPORATION BY REFERENCE: Applicant(s) hereby incorporate herein by reference, any and all U.S. patents, U.S. patent applications, and other documents and printed matter cited or referred to in this application.

FIELD OF THE INVENTION

This invention relates generally to watercraft and more particularly to an enclosed boat enabled for surface and subsurface operation and for control of cavitation in a turbine reaction force propulsion drive.

DESCRIPTION OF RELATED ART

The following art defines the present state of this field:

Lang, U.S. Des. 210,755 describes a submersible watercraft design.

Rowe, U.S. Des. 318,843 describes a submersible hydrofoil design.

Ishigaki, U.S. Des. 408,779 describes a motorboat design.

Frechette, U.D. Des. 415,464 describes a submarine boat design.

McInvale, U.S. Pat. No. 3,131,664 describes a marine vehicle comprising: a hull having a man-carrying compartment which is open to entry of water from the surrounding body of water in which the vehicle is located; ballast tanks in said hull each having upper and lower portions and located on opposite sides of the mancarrying compartment, said tanks being adapted for providing sufficient buoyancy to maintain the vehicle afloat notwithstanding the presence of water in the man-carrying compartment; manually controllable means movable in a given direction for admitting water into said ballast tanks for causing said vehicle to sink; a waterproof housing in said hull; an electric motor operatively mounted within said housing; and waterproof electric power-supply means operatively connected to the electric motor for energizing said electric motor; said vehicle further comprising a normally closed air outlet valve for said tanks; means connecting said valve between the upper portions of said tanks and the exterior of the vehicle; a control handle on said valve movable from a first position in which said valve is closed to a second position in which said valve is open; and linkage means connected to the manually controllable means for engaging the control handle and moving the same to its second position upon the manually controllable means being moved in said given direction.

Gass, U.S. Pat. No. 4,823,722 describes a semi-submersible marine craft for operation on the surface or in a semi-submerged condition having a pair of spaced parallel tubular water ballast floats disposed horizontally on either side of a vertical middle plane. The floats are disposed symmetrically relative to a central nacelle incorporating the power unit for propelling the craft and comprising a water-tight cabin for the passengers. Control apparatus are provided for submerging and surfacing the craft, and the necessary control and safety apparatus for operating the craft. The floats and the nacelle have a frame structure made of an assembly of stainless steel sections, which are covered by a skin of synthetic material. The nacelle has a cabin with a transparent semi-spherical front portion and side windows. On top of the cabin is hingedly mounted a dome for entry into the craft. Releasable ballast are disposed under the nacelle. Flotation control is provided by inflating and deflating air-inflatable balloons enclosed in the side tubular floats and for variably controlling the buoyancy of the craft by controlling the volumes of water ballast entering and leaving the tubular water ballast floats.

Neil et al., U.S. Pat. No. 4,889,066 describes a self-propelled submersible vehicle which comprises a hull and a cockpit defined within the hull, a transparent dome on the top of the hull formed with the cockpit and enclosure walls defining the cockpit within the hull. The cockpit is open ended at the bottom thereof, and the hull is non-watertight. Compressed air tanks are provided in the hull, and these tanks communicate with a regulator valve which provides a constant flow of air into the cockpit forming an air bubble providing a breathable section of the cockpit for the passengers. An air exhaust device is incorporated with the regulator valve assembly for controlling the volume of the air bubble within the cockpit in response to the water level within the cockpit.

Rowe, U.S. Pat. No. 5,237,952 describes a watercraft having positive static buoyancy is provided which is operable both as a hydrofoil and submersible vessel. It is generally shaped in the form of a dolphin or porpoise, with the equivalent of fins acting as both navigation and attitude control mechanisms. Pectoral or forward fins provide hydrofoil struts when manipulated into one position and then are operable as diving planes when displaced into an alternate position. A dorsal fin provides supplemental rudder control. A pair of flukes or rear fins provide for pitch and/or dive control while the vessel operates in the submerged mode. These fins and a propulsion system are either manually or computer controlled by way of hand held joysticks and foot rudders. Submerged operation is achieved with an internal combustion motor by including an air compressor and air storage tank(s) with an air intake arrangement having automatically operable devices serving to open and close an air intake in response to exposure to water. The vessel also provides positive static buoyancy in the event of any systems failure while submerged. If the vessel incurs an impact, a rear hull section containing the fuel tank is jettisoned to avoid fire or explosion. The vessel is capable of limited ballistic flight above the surface of the water, due to a combination of relatively high subsurface velocities attainable and the natural positive buoyancy of the craft, which may be used to enable it to break well clear of the surface.

Kohnen, U.S. Pat. No. 5,704,309 describes a hybrid boat and underwater craft and method for operating an underwater craft having positive buoyancy, a three-point stabilization system and vertical thruster and a system for enhanced buoyancy at the surface.

Onofri, EP0321372 describes a self-propelled manned submersible vehicle of the type comprising a pressure-resistant capsule serving as a cabin, ballast tanks, releasable ballast, propulsion units having propellers driven by electric motors, and storage batteries, the pressure-resistant capsule comprises a peripheral window constituted by a vertical cylindrical sleeve which is entirely transparent, the sleeve is of sufficient diameter to house a plurality of people sitting side-by-side, and extends upwardly from a hemispherical bottom and downwardly from a spherical cap which is extended by a cylindrical conning tower which is closed by a hatch.

The prior art teaches a variety of pointed nose sea crafts including boats and sleds, and submersibles, but does not teach such a craft capable of avoiding cavitation in a turbine drive system by the use of reaction doors. The present invention fulfills these needs and provides further related advantages as described in the following summary.

SUMMARY OF THE INVENTION

The present invention teaches certain benefits in construction and use which give rise to the objectives described below.

A water craft apparatus has an elongated hull with turbine propulsion drive adapted for ingesting water at a turbine water intake and for ejecting the water, with high velocity, at a turbine water outlet. A plurality of water suction apertures are arranged along both a starboard and a port portions of the hull, and these are in communication, through an intake manifold, with the turbine at the water intake for delivering the water from the body of water to the turbine. A plurality of aperture doors are hingably mounted on the hull, each one of the plurality of aperture doors is movable between an open attitude spaced outwardly from the one of the water suction apertures enabling admittance of the water into the intake manifold, and a closed attitude positioned for sealing the one of the water suction apertures. The apertures span a longitudinal distance along the hull. The longitudinal distance exceeds a horizontal length of a wave cycle of the body of water. The aperture doors are closed automatically when the surface level of the body of water moves below any of the aperture.

A primary objective of the present invention is to provide an apparatus and method of use of such apparatus that provides advantages not taught by the prior art.

Another objective is to provide such an invention capable of moving efficiently through a body of water.

A further objective is to provide such an invention capable of avoiding cavitation in a turbine when water intakes are above the water surface.

A still further objective is to provide such an invention capable of replacing fuel with water as the fuel is depleted in the fuel tank.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
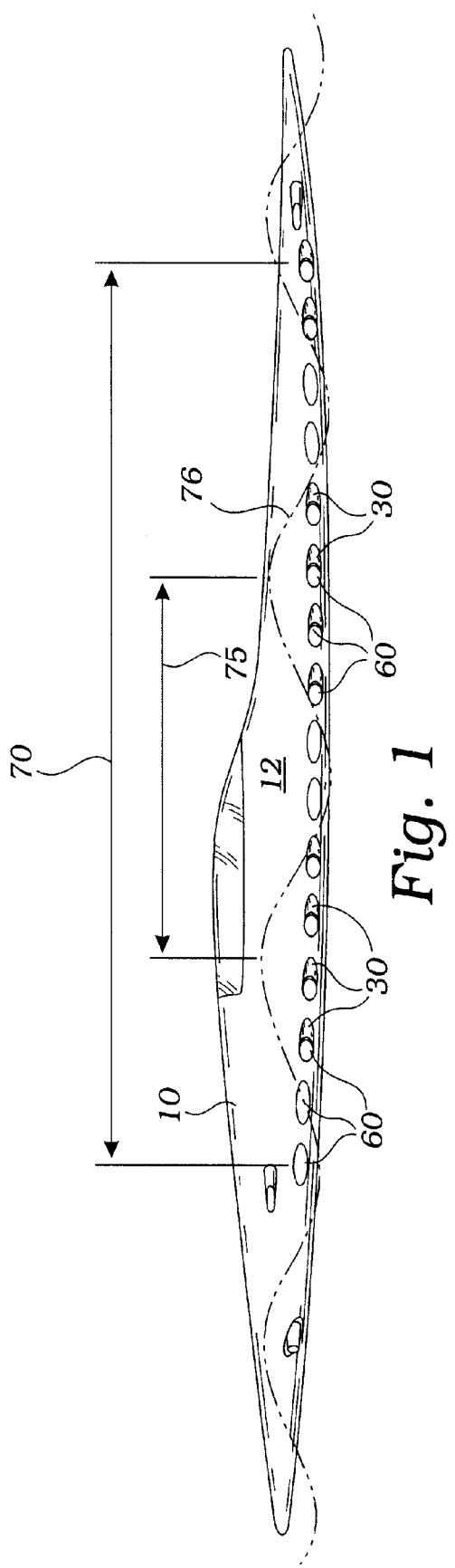
FIG. 1 is a side elevational view of the preferred embodiment of the invention.
Figure 2:
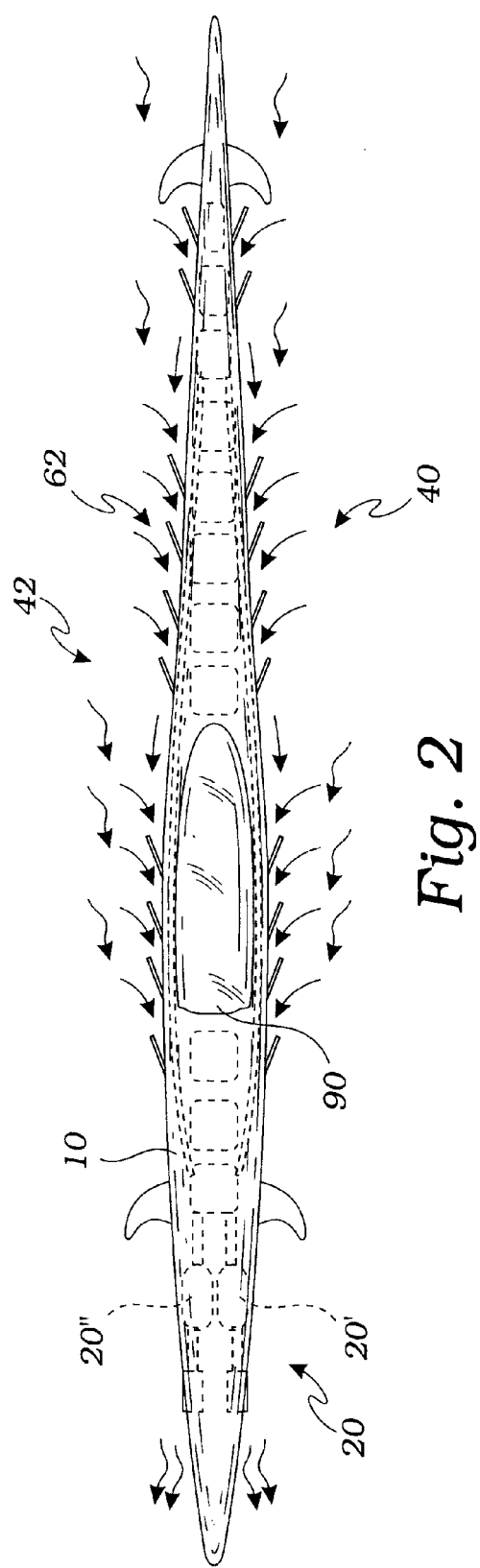
FIG. 2 is a top plan view thereof.
Figure 3:
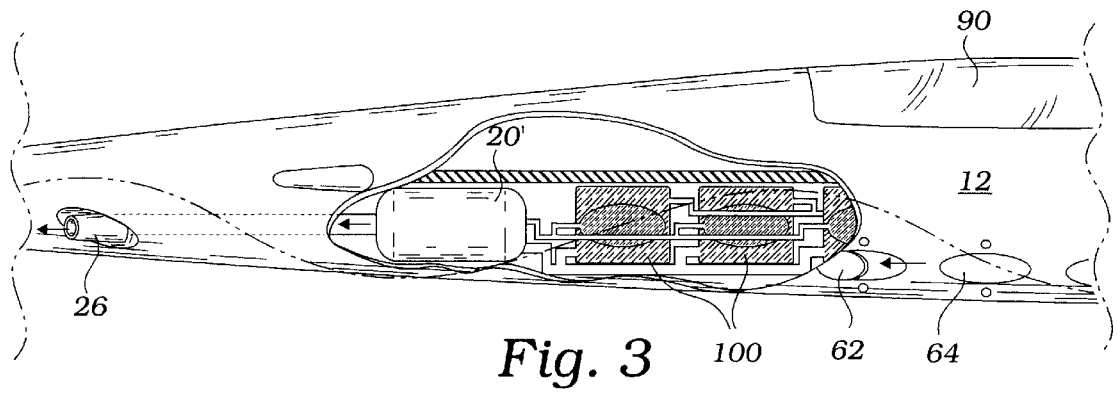
FIG. 3 is a close-up partial side elevational view thereof with a portion of a hull thereof removed to show interior details.
Figure 4:
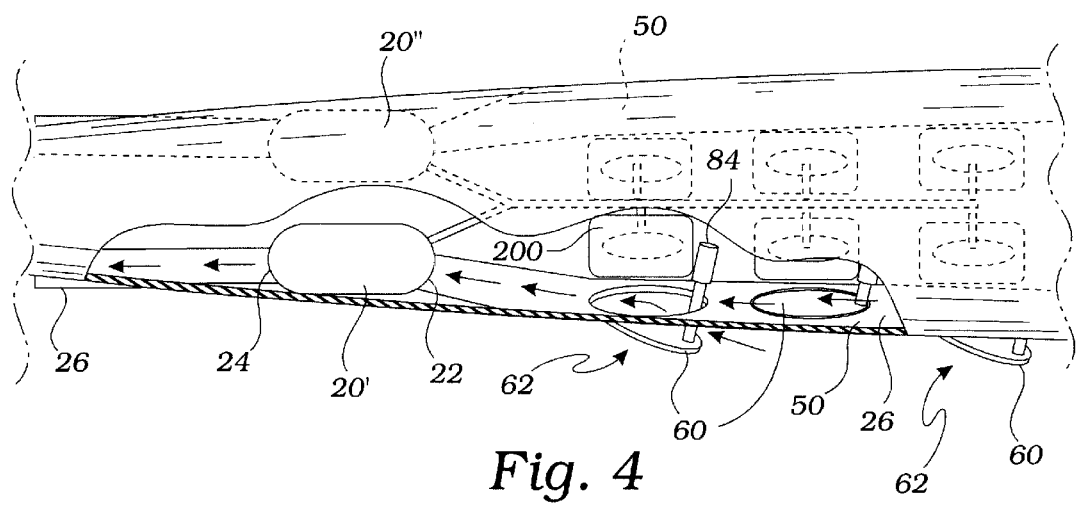
FIG. 4 is a top plan view corresponding to FIG. 3.
Figures 5, 6:
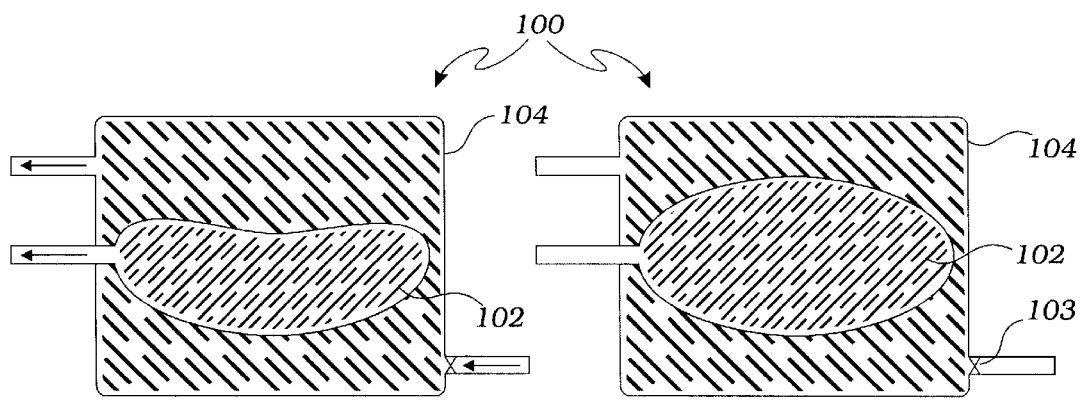
FIGS. 5 and 6 are graphical schematic diagrams showing a ballast and fuel tanks of the invention with the fuel tank partially filled and fully filled respectfully.

The present invention is a water craft apparatus used in a body of water such as an ocean, bay, lake or river. The water craft is constructed with an elongated hull 10 made of any rigid and strong nautical material such as fiberglass, metal or wood. FIGS. 1 and 2 define the preferred embodiment of the craft and it should be noted that the craft has a rather unusual overall length when compared to its beam. The length to beam ratio is in the neighborhood of about 15. As best seen in FIGS. 3 and 4, supported within the hull 10 is a turbine propulsion drive 20 positioned aft, which comprises two turbines 20' and 20". Such turbine drives are very well known in the art and are used, for instance, with jet-ski type personal watercraft. In such drives, sea water is propelled with great force toward the stern of the craft so as to provide forward propulsion. Each of the turbines 20', 20" are adapted for ingesting water at a turbine water intake 22 and for ejecting the water, with high velocity, at a turbine water outlet 24, to an exhaust nozzle 26. Steering of the craft is accomplished through acceleration and deceleration of one or both, of the turbines 20', 20", so that for a movement to port, the starboard turbine 20' is accelerated while the port turbine 20" is decelerated. In a coming-about to starboard, the opposite turbine force changes would be used as is well known in the art. A plurality of water suction apertures 30 are arranged along both a starboard 40 and a port 42 portions of an exterior surface 12 of the elongated hull 10. The suction apertures 30 are in communication, through an intake manifold 50, with the turbine propulsion drive 20 at the turbine water intake 22 for delivering the water from the body of water to the turbines 20' and 20". A plurality of aperture doors 60 are hingably mounted at the exterior surface 12 of the elongated hull 10. The plurality of aperture doors 60 are each movable between an open attitude 62 rotated and spaced outwardly from its corresponding water suction aperture 30, which allows water to flow into the intake manifold 50, and a closed attitude 64 positioned for sealing the corresponding aperture 30. It should be noted that the apertures 30 span a longitudinal distance 70 along the hull 10, which is estimated to exceed the period of typical waves in the body of water. The wave period 75 is the length between consecutive wave peaks (see FIG. 1). A means for reactively hingably moving 80 each one of the aperture doors into the closed attitude when a surface level 76 of the body of water is detected, by a means for water level detection 82, a part of the means for reactively hingably moving 80, to be below the aperture 30. The moving means 80 may be any type of servomechanism such as a pneumatic or hydraulic cylinder 84 engaged with the aperture door 60 as shown in FIG. 4. Such a cylinder 84 is able to move the door 60 between its open and closed positions as necessary. The water level detection means 82 is preferably a resistance device such as an electrical resistance measuring circuit, as for example, a Wheatstone Bridge circuit, wherein one leg of the Bridge is an air gap exposed at the surface 12. When the air gap is submerged the Bridge is balanced, and when the air gap is not submerged, the Bridge is unbalanced, so that it is known when the air gap is submerged or not. When submerged, the cylinder 84 quickly opens door 60 so that water is drawn into the manifold 50. When not submerged, the cylinder 84 quickly closes door 60 to that air is not drawn into the manifold 50 which prevents cavitation of the turbines 20', 20".

Preferably, the elongated hull 10 of the water craft is pointed at forward and aft terminations for improved hydrodynamic movement through the body of water.

Preferably, the elongated hull 10 of the water craft provides a means for accommodation of personnel such as a cockpit 90 shown in FIGS. 1–3.

Preferably, a combination water and fuel ballast tanks 100 are engaged with the turbine propulsion drive 20, wherein an expandable fuel bladder 102 is enclosed within a rigid water ballast bladder 104. The dual bladders 102, 104 are enabled functionally for receiving water into the water bladder 104 to replace any volume of the fuel bladder 102 as the fuel bladder 102 is deflated, as fuel in used causing the fuel bladder 102 to shrink. Fluid pumps (not shown) are used to pump water into and out of the water ballast bladder 104 as ballast mass is needed, as for instance, to operate the craft in a submerged state. As fuel is drawn from the fuel bladder 102, ballast volume is automatically made up by suction at valve 103 which opens valve 103 to admit water from the body of water.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A water craft apparatus floated in a body of water, the water craft apparatus comprising: an elongated hull supporting therein, a turbine propulsion drive positioned amidships, the turbine propulsion drive adapted for ingesting water at a turbine water intake and for ejecting the water, with high velocity, at a turbine water outlet; a plurality of water suction apertures arranged along both a starboard and a port portions of an exterior surface of the elongated hull, the suction apertures in communication, through an intake manifold, with the turbine propulsion drive at the turbine water intake for delivering the water from the body of water to the turbine; a plurality of aperture doors hingably mounted at the exterior surface of the elongated hull, each one of the plurality of aperture doors movable between an open attitude spaced outwardly from the one of the water suction apertures enabling admittance of the water into the intake manifold, and a closed attitude positioned for sealing the one of the water suction apertures, the apertures spanning a longitudinal distance along the hull, the longitudinal distance exceeding a horizontal length of a wave cycle of the body of water; and a means for reactively hingably moving any one of the aperture doors into the closed attitude when a surface level of the body of water is detected, by a means for water level detection, a part of the means for reactively hingably moving, to be below the any one aperture.

2. The apparatus of claim 1 wherein the elongated hull of the water craft is pointed at forward and aft terminations for improved hydrodynamic movement through the body of water.

3. The apparatus of claim 1 wherein the elongated hull of the water craft provides a means for accommodation of personnel.

4. The apparatus of claim 1 wherein the means for water level detection is at least one electrical resistance element.

5. The apparatus of claim 4 further comprising a combination water and fuel ballast tanks engaged with the turbine propulsion drive, wherein an expandable fuel bladder is enclosed within a rigid water ballast bladder the dual bladders enabled functionally for receiving water into the water bladder to replace volume of the fuel bladder as fuel is spent causing the fuel bladder to shrink.

* * * * *